US009296566B2

(12) United States Patent
Finatzer

(10) Patent No.: US 9,296,566 B2
(45) Date of Patent: Mar. 29, 2016

(54) CONVEYOR SYSTEM

(75) Inventor: Karl Heinz Nikolaus Finatzer, Brentwood Park (ZA)

(73) Assignee: Barbara Anne Finatzer, Brentwood Park, Gauteng (ZA)

( * ) Notice: Subject to any disclaimer, the term of this patent is extended or adjusted under 35 U.S.C. 154(b) by 50 days.

(21) Appl. No.: 14/118,058

(22) PCT Filed: May 16, 2012

(86) PCT No.: PCT/ZA2012/000034
§ 371 (c)(1),
(2), (4) Date: Nov. 15, 2013

(87) PCT Pub. No.: WO2012/159132
PCT Pub. Date: Nov. 22, 2012

(65) Prior Publication Data
US 2014/0190788 A1 Jul. 10, 2014

(30) Foreign Application Priority Data

May 19, 2011 (ZA) ................................ 2011/03656

(51) Int. Cl.
*B65G 41/00* (2006.01)
*B65G 17/02* (2006.01)
*B65G 39/20* (2006.01)

(52) U.S. Cl.
CPC .............. *B65G 41/008* (2013.01); *B65G 17/02* (2013.01); *B65G 39/20* (2013.01)

(58) Field of Classification Search
CPC ....... B65G 41/008; B65G 17/02; B65G 39/20
See application file for complete search history.

(56) References Cited

U.S. PATENT DOCUMENTS 2,776,040 A * 1/1957 Snyder ................. B65G 17/066
198/303
3,268,058 A * 8/1966 Buckeridge ............. E21F 13/02
180/253
(Continued)

FOREIGN PATENT DOCUMENTS

CA 2674700 * 6/2008 ............. B65G 41/00
WO 2008067802 6/2008

OTHER PUBLICATIONS

Search Report of the ISA dated Feb. 18, 2013 for PCT Application No. PCT/ZA2012/000034.
(Continued)

*Primary Examiner* — Gene Crawford
*Assistant Examiner* — Thomas Randazzo
(74) *Attorney, Agent, or Firm* — Haugen Law Firm PLLP

(57) ABSTRACT

A conveyor system (10) includes two tracked or wheeled carriages (12); a continuous conveyor belt (16) supported on the carriages (12); an actuator (18) for controlling the relative orientation of the carriages (12); carriage measuring means for measuring either the position of the actuator (18) or the relative orientation of the carriages (12); steering means for steering each carriage (12) while driven forward; distance measuring means for measuring the initial position of a select point on the conveyor system (10) and displacement of the select point from the initial position as the conveyor system (10) is driven forward; recording means for recording the initial position, displacement measurements, and measurements of the carriage measuring means corresponding to each displacement measurement, such that when the conveyor system (10) is driven in reverse, the conveyor system (10) uses the information stored in the recording means to adjust the actuator (18) and cause the conveyor system (10) to follow a similar path it followed when driving forward.

12 Claims, 3 Drawing Sheets

(56) References Cited

U.S. PATENT DOCUMENTS

| | | | | |
|---|---|---|---|---|
| 3,701,411 A * | 10/1972 | McGinnis | B65G 15/56 198/303 |
| 3,974,907 A * | 8/1976 | Shaw | B65G 41/008 198/303 |
| 4,031,997 A * | 6/1977 | Nelson | B65G 41/008 198/301 |
| 4,206,840 A * | 6/1980 | Hanson | B65G 41/008 198/301 |
| 4,256,213 A * | 3/1981 | Shaw | B65G 41/008 198/303 |
| 4,274,783 A * | 6/1981 | Eineichner | G01B 11/043 198/349.95 |
| 4,382,607 A * | 5/1983 | Voight | B62D 53/00 180/14.1 |
| 4,852,724 A * | 8/1989 | Bodimer | E21D 9/12 198/303 |
| 4,865,185 A * | 9/1989 | Bodimer | E21D 9/12 198/303 |
| 6,016,885 A * | 1/2000 | Hickman | B62D 12/00 180/418 |
| 6,155,400 A * | 12/2000 | Daigh | B65G 41/008 198/301 |
| 6,336,545 B1 * | 1/2002 | Arndt | B65G 41/008 198/300 |
| 7,949,447 B2 * | 5/2011 | DeMong | B62D 13/04 180/14.1 |
| 8,562,277 B2 * | 10/2013 | Criswell | B65G 67/08 414/398 |
| 2010/0326746 A1 * | 12/2010 | Kraus | A01B 69/008 180/2.1 |
| 2012/0024662 A1 * | 2/2012 | Steele | B65G 41/008 198/418.6 |

OTHER PUBLICATIONS

Written Opinion of the ISA dated Feb. 18, 2013 for PCT Application No. PCT/ZA2012/000034.

* cited by examiner

CONVEYOR SYSTEM

BACKGROUND

The present invention relates to a conveyor system with actuated carriages.

Conveyor systems with actuated carriages are known. For instance, EP2125582 describes tracked conveyor carriages joined by steering cylinders.

A drawback of the known actuated conveyor systems is that they are difficult to reverse along the same path that the system followed when driving forward.

The conveyor system according to the current invention aims to address this drawback.

SUMMARY OF THE INVENTION

According to the present invention there is provided a conveyor system including:
  at least two tracked or wheeled carriages;
  a continuous conveyor belt supported on the carriages;
  at least one actuator for controlling the relative orientation of the carriages in at least one plane;
  carriage measuring means for measuring either the position of the actuator or the relative orientation of the carriages;
  steering means for steering each carriage when driven forward;
  distance measuring means for measuring the initial position of a select point on the conveyor system and displacement of the select point from the initial position as the conveyor system is driven forward; and
  recording means for recording the initial position, displacement measurements, and measurements of the carriage measuring means corresponding to each displacement measurement,
such that when the conveyor system is driven in reverse, the conveyor system uses the information stored in the recording means to adjust the actuator and cause the conveyor system to follow a similar path it followed when driving forward.

Preferably, the conveyor system includes a sensor on at least one carriage for determining the distance of the carriage from an object in its environment, such that, when driven in reverse, should the carriage come within: (i) a first predetermined range of such object, information from the sensor is used to sound an alarm; (ii) a second predetermined range of such object, information from the sensor is used to effect secondary adjustments to the actuator and steer the carriage away from the object; and (iii) a third predetermined range of such object, movement of the carriage is stopped.

Typically, the actuator is a hydraulic positioning cylinder.

Preferably, the carriage measuring means measures the extension of the hydraulic cylinder. Alternatively, the carriage measuring means comprises an angular position transducer that measures the relative orientation of the carriages.

Typically, the steering means is in automatic mode while the conveyor system is driven in reverse.

Preferably, consecutive carriages are separated by and connected to an articulating link. Typically, the conveyor system further includes a ramp for supporting at least one carriage at the downstream end, the ramp including a low profile frame; a conveyor located within the frame; and guides for guiding the carriage wheels along the ramp.

Preferably, at least one carriage at the downstream end includes a sensor that deactivates the steering means of the carriage as the carriage mounts the ramp.

BRIEF DESCRIPTION OF THE DRAWINGS

The invention will now be described in more detail, by way of example only, with reference to the accompanying drawings in which.

DESCRIPTION OF PREFERRED EMBODIMENT

Figure 1:
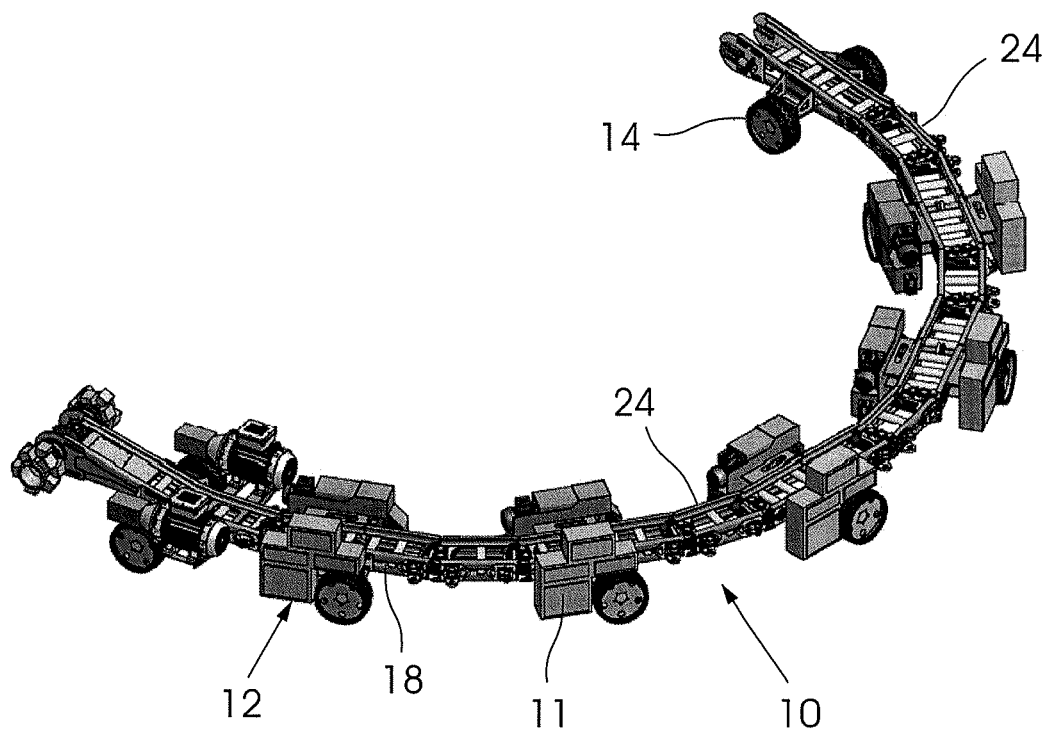
FIG. 1 is an isometric view of a conveyor system according to the invention.
Figure 2:
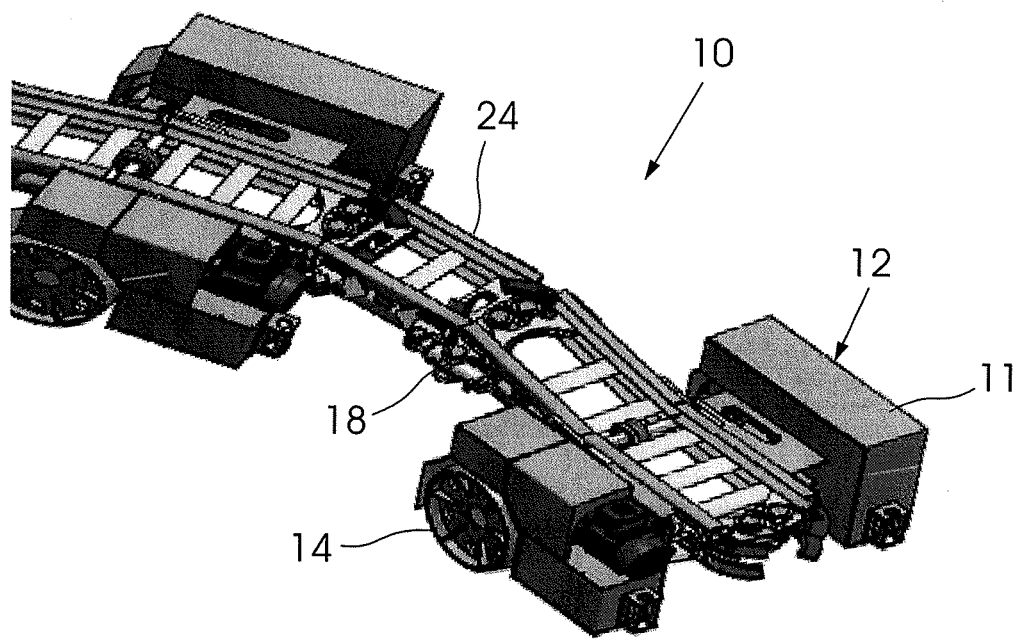
FIG. 2 is an isometric view of the conveyor system in FIG. 1.
Figure 3:
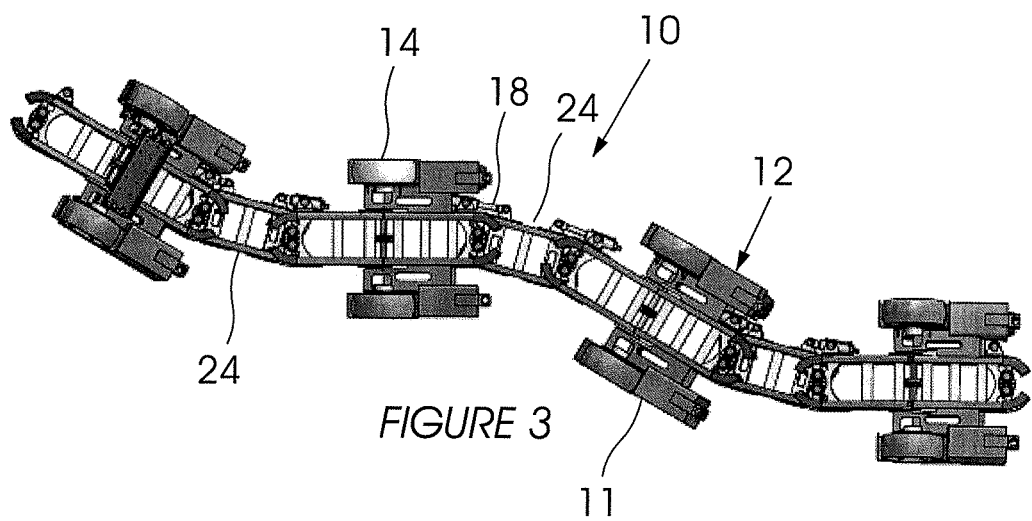
FIG. 3 is a top view of the conveyor system in FIG. 1.
Figure 4:
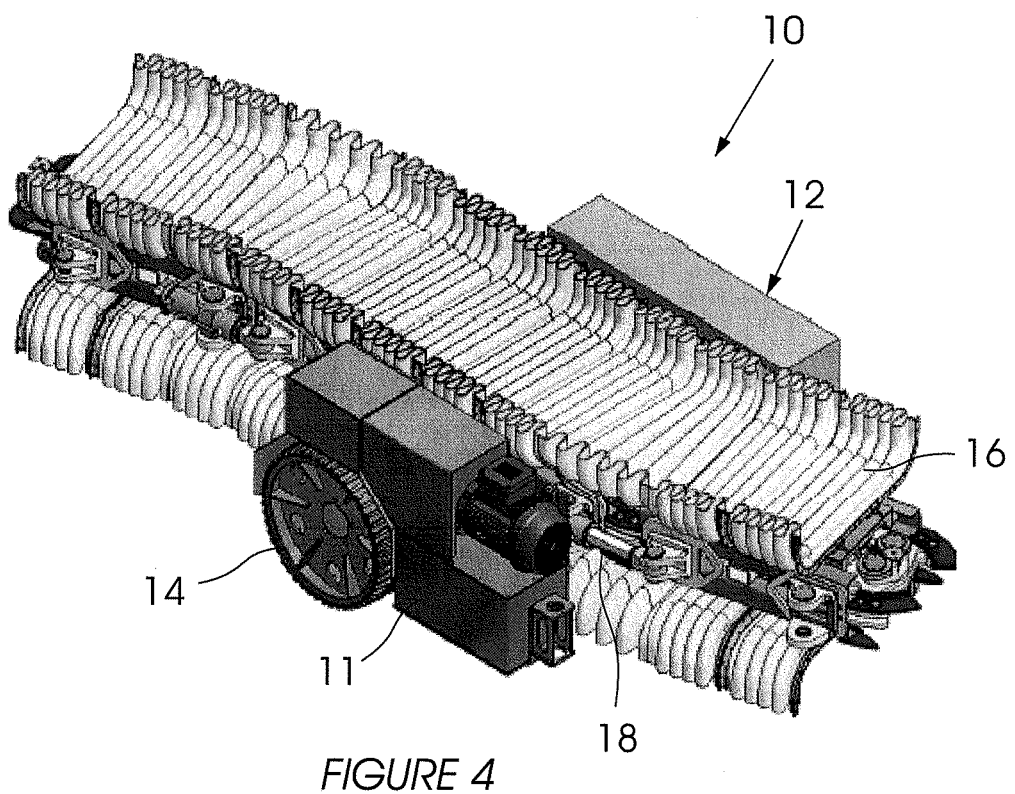
FIG. 4 is an isometric view of the conveyer system in FIG. 1 supporting a composite conveyor belt.

With reference to FIGS. 1 to 5 of the drawings, a conveyor system 10 according to a second aspect of the invention includes: carriages 12 on wheels 14; a continuous composite conveyor belt 16 (shown in FIG. 4) supported on the carriages 12; actuators 18; carriage measuring means (not shown); steering means (not shown); distance measuring means (not shown); and recording means (not shown).

Each carriage 12 is a dual frame structure with steel channel sections for guiding the support wheels of the composite conveyor belt 16 along the top of the frame. This dual structure consists of two joined vertical articulating links which facilitate movement in the vertical plane only. Two wheels 14 are connected to each carriage 12 for driving the carriage forwards and in reverse. The wheels 14 are capable of turning and of moving axially. A drive means 11 is also supported on the carriage 12 for driving the wheels 14 and actuators 18. However, it will be appreciated that the wheels need not necessarily be driven and that additional means for braking and idling, towing or freewheeling may also be added to the carriage 12.

The conveyor belt 16 is pulled along the top of the carriages 12 by a drive chain (not shown), which is driven by a sprocket (no shown) on the conveyor system 10. Material (not shown) is: (i) deposited on the belt 16 at one end of the conveyor system 10; (ii) is conveyed along the upper run of conveyor system 10 as the belt 16 travels along the top of the carriages 12; (iii) and is discharged at the other end of the conveyor system 10 as the belt 16 bends and travels vertically downwards and around to continue its journey along the lower run of conveyor system 10, underneath the carriages.

A belt washing station (not shown) comprises: (i) high pressure fluid jets aimed at the belt 16 as it travels along the lower run of the conveyor system 10; and (ii) a basin (not shown) located below the belt 16 for collecting runoff fluid and debris.

Horizontal articulating links 24 (being a frame without wheels) are interposed between consecutive carriages 12 and hingedly connected thereto. It will be appreciated that although the preferred embodiment includes articulating links 24, carriages 12 may be connected directly without the interposition of an articulating link 24. Connections between carriages 12 and articulating links 24 may permit horizontal movement only.

Actuators 18 in the form of hydraulic positioning cylinders are connected at their ends to the carriage 12 and articulating link 24. By extending and contracting, the actuators 18 control the relative orientation of the carriages 12 and can be used to steer the carriages 12 when driven in reverse. In the preferred embodiment, each actuator 18 and hinge combination permits relative angular movement in one plane only, i.e. horizontally/side to side or vertically/up and down.

Each actuator 18 is equipped with a carriage measuring means (not shown) in the form of a transducer for continuously measuring the position/extension of the actuator. Alternatively, a different form of carriage measuring means may be used to measure the relative orientation of consecutive carriages 12.

Figure 5:
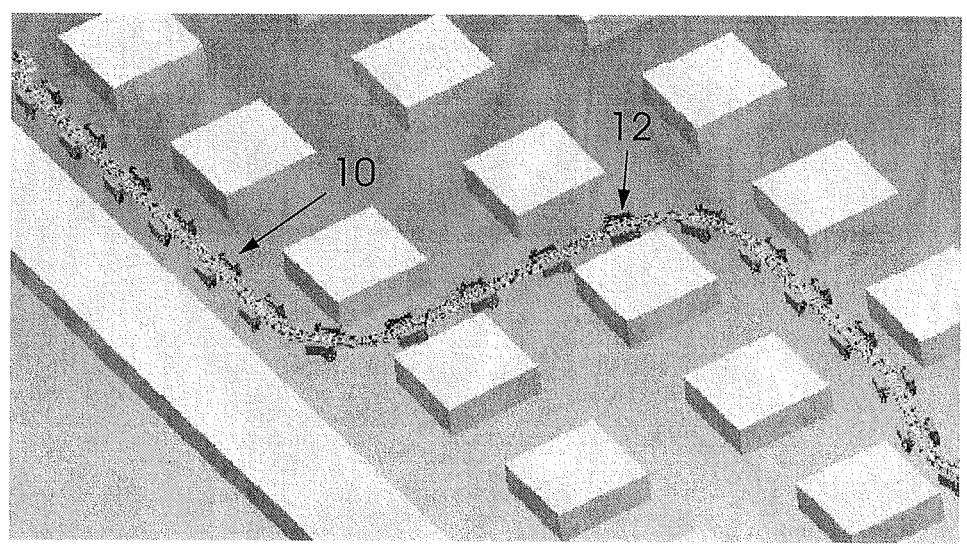
FIG. 5 is a representative view of the conveyor system in FIG. 1 within a simulated mine environment.

As illustrated in FIG. 5, steering means (not shown) to steer the carriages 12 around objects or in a specific direction are operable by the operator (not shown) while the conveyor system 10 is driven forward. Steering is effected by extending/contracting the actuators and/or turning the wheels 14. The steering means is switched to automatic mode while the conveyor system 10 is driven in reverse, preventing operator input.

A distance measuring means in the form of a laser/reflector measuring device (not shown) is used to determine an initial position of the conveyor system 10. As the operator drives and steers the conveyor system 10 forward, the distance measuring device takes continuous readings to calculate the conveyor system's displacement from the initial position. It will be appreciated that various other measuring means may be used, e.g. radar and ultrasonic measuring means.

A recording means (not shown) records: (i) information relating to the initial position of the conveyor system 10; and (ii) data generated by the transducer together with corresponding data from the distance measuring device, while the conveyor system 10 is driven forward. For example, the recording means may record the following data:

| Initial position 1 m | | | |
|---|---|---|---|
| Record | Displacement from initial position | Extension of actuator 1 | Extension of actuator 2 |
| 1 | 0.5 m | 10 mm | 11 mm |
| 2 | 1 m | 15 mm | −2 mm |
| 3 | 1.5 m | −3 mm | 9 mm |

Sensors (not shown) in the form of ultrasonic distance measuring sensors are spaced along the conveyor system 10. The sensors provide information regarding the distance of carriages 12 from objects in its environment. While the conveyor system 10 is driven forward, the sensors warn a programmable logic controller (PLC) and the operator of objects that come within a pre-determined range of the sensor. Furthermore, when driven in reverse, should the carriage 12 come within: (i) a first predetermined range of an object, information from the sensor is used to advise the control system of normal operations (ii) a second predetermined range of an object, information from the sensor is used to effect secondary adjustments to the actuator 18 and steer the carriages 12 away from the object; and (iii) a third predetermined range of an object, movement of the conveyor system 10 may be stopped.

It will be appreciated that the environment and conditions may require the conveyor system's 10 responses to objects within predetermined ranges to vary.

When the conveyor system 10 is driven forward, the operator steers the first carriage 12, and subsequent carriages 12 are automatically steered (using the information in the recording means and PLC) so as to trace the path of the first carriage 12.

To reverse the conveyor system 10, the steering means is operated by the PLC, removing steering control from the operator. And, the information in the recording means is used to replicate positions of the actuators 18 at recorded displacements (subject to secondary adjustments consequent to sensor feedback), thereby causing the conveyor system 10 to reverse and follow substantially the same path that the conveyor system followed when driving forward.

The conveyor system may also include a ramp (not shown) and ride-on frame system on which the downstream end of the conveyor carriages rides. The ramp and ride on frame system comprises a low profile frame with a conveyor system located within the frame, the top of the frame including guides for guiding the conveyor wheels 14 along the top of the ramp. Sensors located on the conveyor carriages 12 deactivate the steering mechanism of the wheels 14 as the carriage 12 mounts the ramp. In operation, the ride-on frame system consists of joined together sections and is frequently extended as the conveyor carriages follows the prime mover (which may be a continuous miner) further into the areas where material extraction takes place.

It will be appreciated that although the conveyor system 10 has been described with wheeled carriages, wheels 14 may be substituted with tracks or other form of mobile conveyance means.

The invention claimed is:

1. A conveyor system including:
at least two tracked or wheeled carriages;
a continuous conveyor belt supported on the carriages;
at least one actuator for controlling the relative orientation of the carriages in at least one plane;
carriage measuring means for measuring either the position of the actuator or the relative orientation of the carriages;
steering means for steering each carriage while driven forward;
a stationary device that is positioned remote from the carriages;
distance measuring means for measuring the initial position of a select point on the conveyor system and displacement of the select point from the initial position as the conveyor system is driven forward, the distance measuring means being selected from the group consisting of a laser device, a radar device, and an ultrasonic device, wherein said distance measuring means utilizes a wave reflected from said stationary device;
a sensor positioned on at least one carriage for determining a distance between the sensor and an object in an environment of the conveyor system;
recording means for recording the initial position, displacement measurements, and measurements of the carriage measuring means corresponding to each displacement measurement,
such that when the conveyor system is driven in reverse, the conveyor system uses the information stored in the recording means to adjust the actuator and cause the conveyor system to follow a similar path it followed when driving forward.

2. A conveyor system according to claim 1, wherein said sensor provides a signal such that when said conveyor system is driven in reverse, should the carriage on which said sensor is located come within (i) a first predetermined range of such object, information from the sensor is used to sound an alarm; (ii) a second predetermined range of such object, information from the sensor is used to effect secondary adjustments to the actuator and steer the carriage away from the object; and (iii) a third predetermined range of such object, movement of the carriage is stopped.

3. A conveyor system according to either claim 1 or claim 2, wherein the actuator is a hydraulic positioning cylinder.

4. A conveyor system according to claim 3, wherein the carriage measuring means measures the extension of the hydraulic positioning cylinder.

5. A conveyor system according to any one of the preceding claims, wherein the steering means is switched into automatic mode while the conveyor system is driven in reverse.

6. A conveyor system according to any one of the preceding claims, wherein consecutive carriages are separated by and connected to an articulating link.

7. A conveyor system according to any one of the preceding claims including a ramp for supporting at least one carriage at the downstream end, the ramp including a low profile frame; a conveyor located within the frame; and guides for guiding the carriage wheels along the ramp.

8. A conveyor system according to claim 7, wherein at least one carriage at the downstream end includes a sensor that deactivates the steering means of the carriage as the carriage mounts the ramp.

9. A conveyor system to convey materials through an environment, said conveyor system comprising:

a first carriage having a dual frame;

a second carriage having a dual frame;

a continuous conveyor belt supported by said first carriage and said second carriage;

each of said first carriage and said second carriage having a vertical actuator to actuate respective dual frames in a vertical direction, said vertical actuator having a transducer coupled thereto that transmits a time dependent signal corresponding to an orientation of the vertical actuator;

a horizontal articulating link interconnecting said first carriage and said second carriage;

at least one horizontal actuator having a first end coupled to said horizontal articulating link and a second end coupled to one of said first carriage and said second carriage, said horizontal actuator having a transducer coupled thereto that transmits a time dependent signal corresponding to an orientation of the horizontal actuator;

steering means for steering each carriage while driven forward or backward;

distance measuring means for measuring the initial position of a select point on the conveyor system relative to the first carriage and second carriage, said distance measuring means further measuring time dependent displacement distances of the initial position as the conveyor system is driven forward and backward;

recording means for recording the initial position and time dependent displacement distances, such that when the conveyor system is driven backward, the conveyor system uses the information stored in the recording means while driven forward to adjust the vertical actuator and horizontal actuator and cause the conveyor system to follow a similar path it followed when driving forward.

10. The conveyor system as recited in claim 9, further including a position sensor that transmits a signal related to a distance of an object in the environment relative to a point on the conveyor system.

11. The conveyor system as recited in claim 9, further including a ramp carriage coupled to one of said first carriage and said second carriage, said ramp including a ramp conveyor supported by the ramp.

12. The conveyor system as recited in claim 11, further including a deactivation sensor that transmits a signal corresponding to a position of the ramp carriage relative to one of said first carriage and said second carriage.

\* \* \* \* \*